US012565558B2

(12) United States Patent (10) Patent No.: US 12,565,558 B2

Otero Martinez et al. (45) Date of Patent: Mar. 3, 2026

(54) FLEXIBLE POLYURETHANE FOAMS HAVING IMPROVED AIR PERMEABILITY

(71) Applicant: BASF SE, Ludwigshafen am Rhein (DE)

(72) Inventors: Iran Otero Martinez, Lemfoerde (DE); Alexander Raeth, Lemfoerde (DE); Patrick Weiss, Lemfoerde (DE); Ansgar Frericks, Lemfoerde (DE); Sonja Altmeppen, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 409 days.

(21) Appl. No.: 16/622,462

(22) PCT Filed: Jun. 19, 2018

(86) PCT No.: PCT/EP2018/066178

§ 371 (c)(1),
(2) Date: Dec. 13, 2019

(87) PCT Pub. No.: WO2019/002013

PCT Pub. Date: Jan. 3, 2019

(65) Prior Publication Data

US 2020/0157273 A1 May 21, 2020

(30) Foreign Application Priority Data

Jun. 27, 2017 (EP) ..................................... 17178122

(51) Int. Cl.
| | |
|---|---|
| *C08G 18/22* | (2006.01) |
| *C08G 18/48* | (2006.01) |
| *C08G 18/76* | (2006.01) |
| *C08J 9/00* | (2006.01) |

(52) U.S. Cl.
CPC ....... *C08G 18/4812* (2013.01); *C08G 18/225* (2013.01); *C08G 18/4829* (2013.01); *C08G 18/7671* (2013.01); *C08J 9/0014* (2013.01); *C08G 2110/0008* (2021.01); *C08G 2110/005* (2021.01); *C08G 2110/0058* (2021.01); *C08G 2110/0083* (2021.01); *C08J 2201/022* (2013.01); *C08J 2203/10* (2013.01); *C08J 2205/06* (2013.01)

(58) Field of Classification Search
None
See application file for complete search history.

(56) References Cited

U.S. PATENT DOCUMENTS

| | | | |
|---|---|---|---|
| 8,318,823 | B2 | 11/2012 | Triouleyre et al. |
| 8,362,099 | B2 | 1/2013 | Harre et al. |
| 9,234,066 | B2 | 1/2016 | Freidank et al. |
| 2008/0194718 | A1 | 8/2008 | Schuster et al. |

| | | | | |
|---|---|---|---|---|
| 2014/0066535 | A1* | 3/2014 | Jacobs | ..................... C08L 75/04 |
| | | | | 521/159 |
| 2015/0004389 | A1* | 1/2015 | Corinti | ............... C08G 18/4829 |
| | | | | 428/220 |
| 2020/0085369 | A1* | 3/2020 | Vu | ......................... A61B 5/398 |

FOREIGN PATENT DOCUMENTS

| | | | |
|---|---|---|---|
| CA | 2857609 | A1 | 6/2013 |
| DE | 4318120 | A1 | 12/1994 |
| DE | 10314762 | A1 | 10/2004 |
| DE | 102007061883 | A1 | 6/2009 |
| EP | 1888664 | A2 | 2/2008 |
| EP | 2331597 | A1 | 6/2011 |
| EP | 2599810 | A1 | 6/2013 |
| WO | WO-2006034800 | A1 | 4/2006 |
| WO | WO-2006125740 | A2 | 11/2006 |
| WO | WO-2009003964 | A1 | 1/2009 |
| WO | WO-2009138379 | A2 | 11/2009 |
| WO | WO-2010034770 | A1 | 4/2010 |

OTHER PUBLICATIONS

International Search Report for PCT/EP2018/066178 mailed Oct. 5, 2018.
Written Opinion of the International Searching Authority for PCT/EP2018/066178 mailed Oct. 5, 2018.
Diller, et al., "Chapter 3—Rohstoffe", Plastics Handbook, vol. 7, 3rd Edition, 1993, pp. 57-75.
Dr. Baatz, et al., "Chapter 5—PUR-Weichschaumstoffe", Plastics Handbook, vol. 7, 3rd Edition, 1993, pp. 193-265.
European Search Report for EP Patent Application No. 17178122.2, Issued on Sep. 28, 2017, 3 pages.
Haas, et al., "Hilfs- und Zusatzstoffe fiir Polyurethane", Plastics Handbook, vol. 7, Chapter 3.4, 3rd Edition, 1993, pp. 104-127.

* cited by examiner

*Primary Examiner* — Melissa A Rioja

(74) *Attorney, Agent, or Firm* — Faegre Drinker Biddle & Reath LLP

(57) ABSTRACT

The present invention relates to polyol mixtures comprising (b1) at least one polyether polyol having a hydroxyl value of 10 to 60 mg KOH/g and having a high proportion of ethylene oxide, (b2) at least one polyether polyol having a hydroxyl value of 10 to 100 mg KOH/g, a low proportion of ethylene oxide, and not less than 40% primary OH groups, and (b3) at least one polyether polyol having a hydroxyl value of 10 to 100 mg KOH/g, a low proportion of ethylene oxide, and not more than 30% primary OH groups.

The invention further relates to a process for producing flexible polyurethane foams using the mixtures according to the invention, to the thereby obtainable flexible polyurethane foams, and to the use of the thereby obtainable flexible polyurethane foams as a mattress or cushion, as a cushioning element for furniture or as a seat element.

19 Claims, No Drawings

FLEXIBLE POLYURETHANE FOAMS HAVING IMPROVED AIR PERMEABILITY

CROSS-REFERENCE TO RELATED APPLICATIONS

This application is a national stage application (under 35 U.S.C. § 371) of PCT/EP2018/066178, filed Jun. 19, 2018, which claims benefit of European Application No. 17178122.2, filed Jun. 27, 2017, both of which are incorporated herein by reference in their entirety.

The present invention relates to polyol mixtures comprising (b1) at least one polyether polyol having a hydroxyl value of 10 to 60 mg KOH/g and having a high proportion of ethylene oxide, (b2) at least one polyether polyol having a hydroxyl value of 10 to 100 mg KOH/g, a low proportion of ethylene oxide, and not less than 40% primary OH groups, and (b3) at least one polyether polyol having a hydroxyl value of 10 to 100 mg KOH/g, a low proportion of ethylene oxide, and not more than 30% primary OH groups.

The invention further relates to a process for producing flexible polyurethane foams using the mixtures according to the invention, to the thereby obtainable flexible polyurethane foams, and to the use of the thereby obtainable flexible polyurethane foams as a mattress or cushion, as a cushioning element for furniture or as a seat element.

Flexible polyurethane foams are used in particular in the production of furniture and mattresses and also for car seats and car carpets.

Important basic properties for such applications are mechanical parameters such as hardness, elasticity, elongation, and tensile strength. For most applications, for example cushioning for seats or mattresses, there exist fixed requirements for the hardness. A particular comfort feature of flexible polyurethane foams imbued with hardness is high elasticity. Flexible foams with not less than 30% rebound resilience can be described as elastic and flexible foams with a rebound resilience of less than 30% as viscoelastic.

Another important parameter for flexible polyurethane foams is their density. An aim here is to reduce the density for cost and weight reasons in order to use as little material as possible. However, reducing the density while leaving the hardness unchanged results in a reduction in elasticity.

Another important parameter for the comfort properties of flexible polyurethane foams in furniture for sitting and lying down is high air permeability.

Flexible polyurethane foams are known from the prior art. EP2331597 A1 describes the production of flexible polyurethane foams based on polyether polyols having a hydroxyl value of 20 to 100 mg KOH/g and having ethylene oxide in a proportion of at least 40% by weight as cell-opening polyol in combination with polyether polyols having a hydroxyl value of 20 to 100 mg KOH/g and ethylene oxide in a proportion of less than 40% by weight.

WO 2009/003964 A1 discloses polyether polyol mixtures comprising a hydrophilic polyether poyol having a hydroxyl value of 20 to 200 mg KOH/g and having ethylene oxide in a proportion of at least 50% by weight alongside a hydrophobic polyether polyol having a hydroxyl value of 20 to 100 mg KOH/g and having at least 60% by weight of propylene oxide, with the latter comprising terminal ethylene oxide units, i.e. primary OH end groups.

Flexible polyurethane foams with a compression hardness at 40% according to DIN EN ISO 3386 of appreciably more than 2 kPa, a tensile strength according to DIN EN ISO 1798 of at least 50 kPa, a high elongation at break of at least 100% according to DIN EN ISO 1798, and high rebound resilience are known.

The known flexible polyurethane foams are, however, in need of improvement in their comfort features, particularly the air permeability, and in their durability, particularly the loss of hardness in the fatigue test according to DIN EN ISO 3385.

It was therefore an object of the present invention to avoid the abovementioned disadvantages. In particular, the invention sought to make available flexible polyurethane foams that have favorable durability and favorable comfort properties in the application area of furniture for sitting and lying down.

A particular object of the present invention was to make available flexible polyurethane foams having high air permeability and low loss of hardness in the fatigue test.

The flexible polyurethane foams needed to have high compression hardness, tensile strength, and elongation at break allied with high elasticity.

It was a further object of the present invention to provide flexible polyurethane foams that have a broad processing range and are producible as slabstock foams or molded foams.

These objects were achieved by the mixtures according to the invention, the process according to the invention for producing flexible polyurethane foams, and the thereby obtainable flexible polyurethane foams.

The present invention relates to mixtures b) comprising the following components b1) to b3) and optionally b4) and b5):

b1) 75 to 94% by weight of at least one polyether polyol having a hydroxyl value of 10 to 60 mg KOH/g, an OH functionality of at least 2, and ethylene oxide in a proportion of 50 to 100% by weight based on the content of alkylene oxide, b2) 3 to 20% by weight of at least one polyether polyol having a hydroxyl value of 10 to 100 mg KOH/g, an OH functionality of at least 2, ethylene oxide in a proportion of 2 to 30% by weight based on the content of alkylene oxide, and a proportion of primary OH groups of 40 to 100% based on the total number of OH groups in component b2), b3) 3 to 20% by weight of at least one polyether poyol having a hydroxyl value of 10 to 100 mg KOH/g, an OH functionality of at least 2, ethylene oxide in a proportion of 0 to 30% by weight based on the content of alkylene oxide, and a proportion of primary OH groups of 0 to 30% based on the total number of OH groups in component b3), in each case based on the total amount by weight of components b1) to b3), which comes to 100% by weight, and also b4) from 0 to 10 further parts by weight, based on 100 parts by weight of components b1) to b3), of at least one further polyether polyol that differs from components b1) to b3), and b5) from 0 to 30 further parts by weight of fillers, based on 100 parts by weight of components b1) to b3), optionally present as a constituent of a graft polyol based on one or more of components b1) to b3).

Preferred embodiments can be discerned from the claims and from the description. Combinations of preferred embodiments do not depart from the scope of this invention. Preferred embodiments are elucidated in more detail hereinafter.

For the purposes of the present invention, functionality of a compound is to be understood as meaning the number of reactive groups per molecule. A polyfunctional compound thus has a functionality of at least 2.

In the case of the polyether polyols in mixture b), the functionality refers to the number of reactive OH groups per molecule. In the case of the polyisocyanates in component a), the functionality refers to the number of reactive NCO groups per molecule.

If mixtures of compounds with different functionality are used for a particular component, the functionality of the components is the result in each case of the numberweighted mean of the functionality of the individual compounds, i.e. functionality is always to be understood as meaning the number-average functionality.

For the purposes of the present invention, the hydroxyl value is understood as meaning the hydroxyl value determined according to DIN 53240. It is expressed in mg KOH/g.

The hydroxyl value is related to the molecular weight Mn via the formula $Mn \ [g/mol] = (f*56106 \ g/mol)/OHV \ [mg/g]$, where f is the OH functionality of the polyether polyol.

The proportions of primary and secondary OH groups are preferably determined from the $^1$H NMR spectra of the peracetylated polyether polyols according to ASTM D-4273-11.

For the purposes of the invention, polyurethane foams are understood as meaning foams according to DIN 7726. The flexible polyurethane foams according to the invention preferably have a compressive stress at 40% compression according to DIN EN ISO 3386 of 15 kPa and lower, more preferably from 1 to 14 kPa and particularly preferably from 2 to 14 kPa. Flexible polyurethane foams according to the invention have an open-cell character according to DIN EN ISO 7231 of preferably greater than 2.5 dm$^3$/s, more preferably greater than 3.0 dm$^3$/s, particularly preferably greater than 3.5 dm$^3$/s. Further details on flexible polyurethane foams are given in "Kunststoffhandbuch [Plastics Handbook], volume 7, Polyurethane [Polyurethanes]", Carl Hanser Verlag, 3rd edition 1993, chapter 5.

According to the invention, the mixtures comprise from 75 to 94% by weight (based on the total amount by weight of components b1) to b3), which comes to 100% by weight) of at least one polyether polyol having a hydroxyl value of 10 to 60 mg KOH/g, an OH functionality of at least 2, and ethylene oxide in a proportion of 50 to 100% by weight based on the content of alkylene oxide.

Such polyether polyols may be referred to as cell-opening polyols, since their inclusion generally gives the flexible polyurethane foams increased open-cell character. The cell-opening polyols included according to the invention are known from the prior art. The amounts of cell-opening polyol used in the prior art in the production of elastic foams are generally less than 20% by weight of the polyol component.

The proportion of component b1) in the total amount of components b1), b2), and b3) is preferably from 78 to 92% by weight, more preferably from 80 to 90% by weight, particularly preferably from 82 to 89% by weight.

The hydroxyl value of the polyether polyols in component b1) is preferably from 15 to 58 mg KOH/g, more preferably from 20 to 55 mg KOH/g, particularly preferably from 25 to 50 mg KOH/g.

The OH functionality of the polyether polyols in component b1) is preferably not more than 8. The OH functionality of the polyether polyols in is further preferably more than 2.

The OH functionality of the polyether polyols in component b1) is particularly preferably from 2.2 to 4, most preferably from 2.4 to 3.3.

The proportion of primary OH groups in the polyether polyols in component b1) based on the total number of OH groups is preferably at least 40%, more preferably at least 50%, particularly preferably at least 60%, most preferably at least 70%, with the OH groups being OH end groups and with primary and secondary OH groups being taken into consideration here. In one embodiment in which ethylene oxide is used exclusively as the alkylene oxide, there are 100% primary end groups present.

The preparation of polyether polyols according to component b1) is known from the prior art. Polyether polyols suitable for component b1) and their preparation are described in more detail in DE4318120 for example.

Starter compounds used for preparing the polyether polyols in component b1) are preferably hydroxy-functional or amino-functional. Examples of suitable starter compounds are propylene glycol, ethylene glycol, diethylene glycol, dipropylene glycol, 1,2-butanediol, 1,3-butanediol, 1,4-butanediol, hexanediol, pentanediol, 3-methyl-1,5-pentanediol, 1,12-dodecanediol, glycerol, trimethylolpropane, triethanolamine, pentaerythritol, sorbitol, sucrose, hydroquinone, pyrocatechol, resorcinol, bisphenol F, b1-sphenol A, 1,3,5-trihydroxybenzene, methylol-containing condensates of formaldehyde and phenol or melamine or urea. The starter compound used is preferably glycerol, trimethylolpropane, sucrose, and/or sorbitol.

The polyether polyols in component b1) are particularly preferably prepared on the basis of trifunctional starters, in particular glycerol.

The proportion of ethylene oxide in the total amount by weight of alkylene oxide in component b1) is preferably from 60 to 100% by weight, more preferably from 65 to 90% by weight, particularly preferably from 70 to 85% by weight. In a first preferred embodiment, ethylene oxide is used exclusively as the alkylene oxide.

In a further preferred embodiment, ethylene oxide is used in admixture with at least one further alkylene oxide. Examples of suitable further alkylene oxides are propylene oxide, 1,2-butylene oxide or 2,3-butylene oxide, and styrene oxide. The further alkylene oxide is preferably propylene oxide.

Propylene oxide and ethylene oxide are preferably fed into the reaction mixture individually, in admixture, or successively. If the alkylene oxides are added successively, the products produced comprise polyether chains with block structures. Increasing the proportion of ethylene oxide in the ethylene oxide/propylene oxide mixture generally results in an increase in the proportion of primary OH groups in the polyether polyol. The proportion of primary OH end groups can be increased through subsequent addition of pure ethylene oxide. Products having ethylene oxide end blocks have a particularly high proportion of primary OH groups.

According to the invention, mixtures b2) comprise 3 to 20% by weight (based on the total amount by weight of components b1) to b3), which comes to 100% by weight) of at least one polyether polyol having a hydroxyl value of 10 to 100 mg KOH/g, an OH functionality of at least 2, ethylene oxide in a proportion of 2 to 30% by weight based on the content of alkylene oxide, and a proportion of primary OH groups of 40 to 100% based on the total number of OH groups in component b2).

The proportion of component b2) in the total amount of components b1), b2), and b3) is preferably from 3 to 18% by weight, more preferably from 4 to 18% by weight, particu-
lady preferably from 4 to 15% by weight.

The hydroxyl value of the polyether polyols in component
b2) is preferably from 15 to 90 mg KOH/g, more preferably
from 20 to 80 mg KOH/g, particularly preferably from 25 to
50 mg KOH/g.

The proportion of primary OH groups in the polyether
polyols in component b2) based on the total number of OH
groups in component b2) is preferably from 50 to 90%, more
preferably from 60 to 90%, particularly preferably from 70
to 90%.

The OH functionality of the polyether polyols in compo-
nent b2) is preferably greater than 2, more preferably at least
2.4, and particularly preferably at least 2.6. The OH func-
tionality of the polyether polyols in component b2) is
preferably not more than 8, more preferably not more than
4, and particularly preferably not more than 3.3.

In a first preferred embodiment, preferred polyether poly-
ols in component b2) have an OH functionality of more than
2 and not more than 4, more preferably from 2.4 to 4,
particularly preferably from 2.6 to 3.3.

In a further embodiment, preference is given to the use in
component b2) of highly functional polyether polyols hav-
ing an OH functionality of more than 4 and not more than
8, particularly preferably of more than 4 to 6. In this
embodiment, particular preference is given to the use as
starter of sucrose, sorbitol or mixtures thereof or mixtures of
the aforementioned compounds with glycerol.

The preparation of polyether polyols according to com-
ponent b2) is known from the prior art. Suitable polyether
polyols according to component b2) can be prepared by
known processes, for example by anionic polymerization
using as catalysts alkali metal hydroxides, for example
sodium hydroxide or potassium hydroxide, or alkali metal
alkoxides, for example sodium methoxide, sodium ethoxide
or potassium ethoxide, or potassium isopropoxide. One such
method of preparation is described in more detail in
DE4318120.

Suitable starter compounds for preparing the polyether
polyols in components b2) are identical to those mentioned
under component b1).

In a preferred embodiment, the polyether polyols in
component b2) are prepared on the basis of trifunctional or
higher functional starters, particularly preferably trifunc-
tional starters, most preferably glycerol.

The proportion of ethylene oxide in the total amount by
weight of alkylene oxide in component b2 is preferably from
5 to 30% by weight, more preferably from 5 to 25% by
weight, particularly preferably from 8 to 22% by weight.
Ethylene oxide is thus used in admixture with at least one
further alkylene oxide.

Examples of suitable further alkylene oxides are propyl-
ene oxide, 1,2-butylene oxide or 2,3-butylene oxide, and
styrene oxide. The further alkylene oxide is preferably
propylene oxide.

Propylene oxide and ethylene oxide are preferably fed
into the reaction mixture individually, in admixture, or
successively. If the alkylene oxides are added successively,
the products produced comprise polyether chains with block
structures. The addition of pure ethylene oxide in the last
step of the alkoxylation results in products with ethylene
oxide end blocks. Such products having ethylene oxide end
blocks have a particularly high proportion of primary end
groups.

In a preferred embodiment, component b2 is used wholly
or partly in the form of graft polyols, i.e. in combination with component b5, to form mixture b. This embodiment is
elucidated in more detail hereinafter in the context of
component b5).

According to the invention, mixtures b3) comprise 3 to
20% by weight (based on the total amount by weight of
components b1) to b3), which comes to 100% by weight) of
at least one polyether polyol having a hydroxyl value of 10
to 100 mg KOH/g, an OH functionality of at least 2, ethylene
oxide in a proportion of 0 to 30% by weight based on the
content of alkylene oxide, and a proportion of primary OH
groups of 0 to 30% based on the total number of OH groups
in component b3).

The proportion of component b3) in the total amount of
components b1), b2), and b3) is preferably from 4 to 18% by
weight, more preferably from 4 to 16% by weight, particu-
larly preferably from 4 to 15% by weight, most preferably
from 5 to 14% by weight. The hydroxyl value of the
polyether polyols in component b3) is preferably from 15 to
90 mg KOH/g, more preferably from 20 to 80 mg KOH/g,
particularly preferably from 25 to 75 mg KOH/g, most
preferably from 35 to 65 mg KOH/g.

The proportion of primary OH groups in the polyether
polyols in component b3) based on the total number of OH
groups in component b3) is preferably from 0 to 25%, more
preferably from 0 to 20%, particularly preferably from 0 to
15%, most preferably from 0 to 10%.

The OH functionality of the polyether polyols in compo-
nent b3) is preferably greater than 2, more preferably at least
2.2, and particularly preferably at least 2.4. The OH func-
tionality of the polyether polyols in component b3) is
preferably not more than 4, more preferably not more than
3, and particularly preferably not more than 2.8.

In a preferred embodiment, preferred polyether polyols in
component b3) have an OH functionality of more than 2 and
not more than 4, more preferably from 2.2 to 3, particularly
preferably from 2.4 to 2.8.

The preparation of polyether polyols according to com-
ponent b3) is known from the prior art. Suitable polyols are
prepared by known methods, for example by anionic polym-
erization using as catalysts alkali metal hydroxides, for
example sodium hydroxide or potassium hydroxide, or
alkali metal alkoxides, for example sodium hydroxide or
potassium hydroxide, or alkali metal alkoxides, for example
sodium methoxide, sodium ethoxide or potassium ethoxide
or potassium isopropoxide, or by double-metal cyanide
catalysis from one or more alkylene oxides having 2 to 4
carbon atoms in the alkylene radical. Such methods of
preparation are described in more detail for example in
DE4318120 and WO2006/034800.

Suitable starter compounds for preparing the polyether
polyols in components b3) are identical to those listed under
component b1).

In a preferred embodiment, the polyether polyols in
component b3) are prepared on the basis of difunctional,
trifunctional or higher functional starters, most preferably
glycerol, monoethylene glycol, and/or diethylene glycol.

The alkylene oxide in component b3) preferably com-
prises propylene oxide. In a first preferred embodiment,
propylene oxide is used exclusively as the alkylene oxide.

In a further preferred embodiment, propylene oxide is
used in admixture with at least one further alkylene oxide.
Examples of suitable further alkylene oxides are ethylene
oxide, 1,2-butylene oxide or 2,3-butylene oxide, and styrene
oxide. The further alkylene oxide is preferably ethylene
oxide.

The proportion of ethylene oxide in the total amount by
weight of alkylene oxide in component b3) is preferably from 0 to 20% by weight, more preferably from 0 to 15% by weight, particularly preferably from 0 to 12% by weight.

Propylene oxide and ethylene oxide are preferably fed into the reaction mixture individually, in admixture, or successively. If the alkylene oxides are added successively, the products produced comprise polyether chains with block structures. The addition of pure propylene oxide or of alkylene oxide mixtures mainly comprising propylene oxide in the last step of the alkoxylation results in products with propylene oxide end blocks. Products having propylene oxide end blocks have a particularly high proportion of secondary OH groups.

In a preferred embodiment, component b3) is added partly in the form of graft polyols, i.e. in combination with component b5), to form mixture b according to the invention. This embodiment is elucidated in more detail hereinafter.

Mixtures b according to the invention optionally comprise, as component b4), from 0 to further parts by weight (based on 100 parts by weight of components b1 to b3) of at least one polyether polyol that differs from components b1) to b3).

In a preferred first embodiment, mixtures b according to the invention comprise no further polyether polyols according to component b4). In a second preferred embodiment, mixtures b according to the invention comprise from 0.01 to 10 further parts by weight (based on 100 parts by weight of components b1 to b3) of at least one further polyether polyol that differs from components b1) to b3), more preferably from 1 to 10 further parts by weight, particularly preferably from 1 to 5 further parts by weight.

Mixtures b) according to the invention optionally comprise, as component b5), from 0 to further parts by weight of fillers, based on 100 parts by weight of components b1) to b3). In the context of the present invention, a filler is understood as meaning a solid. The fillers are preferably present as a constituent of at least one graft polyol based on components b2) and/or b3).

In a first preferred embodiment, the mixtures according to the invention comprise no fillers according to components b5). In a second preferred embodiment, mixtures b) according to the invention comprise from 0.01 to 30 further parts by weight of fillers, based on 100 parts by weight of components b1) to b3), more preferably from 0.2 to 25 further parts by weight, particularly preferably from 0.3 to 10 further parts by weight, most preferably from 0.5 to 8 further parts by weight.

In a preferred embodiment, the fillers are present in mixture b) as a constituent of graft polyols, i.e. in combination with polyether polyols. The use of graft polyols results in improved tensile strength. The use of graft polyols results moreover in mixtures b having better compatibility and long-term stability. As the base polymer for the graft polyols, it is advantageous to use polyether polyols according to component b2 and/or b3. Such graft polyols are known from the prior art or can be prepared by known methods.

Particularly preferable as filler are SAN particles (styrene-acrylonitrile particles). Also suitable as graft polyols are polymer-modified polyether polyols, preferably graft polyether polyols, particularly preferably ones based on styrene and/or acrylonitrile, which are prepared by in-situ polymerization of acrylonitrile, styrene or preferably mixtures of styrene and acrylonitrile, for example in a weight ratio of 90:10 to 10:90, preferably 70:30 to 30:70, advantageously in the abovementioned polyether polyols, and also polyether polyol dispersions that comprise, usually in an amount from 1 to 50% by weight, preferably 2 to 25% by weight, as a disperse phase: for example, polyureas, polyhydrazides, polyurethanes comprising tertiary amino groups, and/or melamine. Such production processes are described in more detail in, for example, "Dow Polyurethanes Flexible Foams", 2nd edition 1997, chapter 2.

Alternatively, the fillers, which are preferably present as dispersed filler particles, may also be obtained in the so-called melt emulsification process. This process is described in WO2009/138379. In the process, a thermoplastic polymer, optionally together with a stabilizer, and polyamine are heated to a temperature above the melting point of the thermoplastic polymer, homogenized, for example using ultrasound, an extruder or a toothed-ring dispersing machine, and cooled to a temperature below the melting point of the thermoplastic polymer. AN thermoplastic polymers may in principle be used for this. Preference is given to the use of thermoplastic polymers that can be obtained by polymerization of the abovementioned monomers. Optionally, an emulsifier is further added. For example, the stabilizers and emulsifiers described in WO 2009/138379 may be used. In a preferred embodiment, the thermoplastic polymer to be used in the melt emulsification process consists of polystyrene-acrylonitrile.

Preferred mixtures b) comprise from 80 to 94% by weight of component b1), from 3 to 18% by weight of component b2), and from 3 to 16% by weight of component b3). Particularly preferred mixtures b) comprise from 80 to 92% by weight of component b1), from 4 to 16% by weight of component b2), and from 4 to 15% by weight of component b3).

In addition, the present invention relates to a process for producing flexible polyurethane foams in which the following components are mixed to form a reaction mixture and converted into the flexible polyurethane foam:

a) at least one polyisocyanate, wherein at least one of the polyisocyanates present is based on diphenylmethane diisocyanate (MDI), b) a mixture b according to the invention, c) optionally chain extenders and/or crosslinkers, d) at least one catalyst, and e) at least one blowing agent comprising water, and optionally f) one or more additives that differ from components a) to e).

In the production of the flexible polyurethane foams, two or more liquid streams are preferably combined with one another. The mixing of these liquid streams initiates the polymerization and foaming of the polymerizing material. Polymerization and shaping are often done in a single step, typically by shaping the reaction mixture while it is still liquid. In addition, polyurethanes are also often produced in the form of blocks that are then cut into the desired shape.

The abovementioned two liquid streams are preferably component a) and a premix of components b), c), d), e), and optionally f). In the production of block foams, it is usual for more than two liquid streams to be combined with one another.

Preferred components a), c), d), e), and optionally f) are elucidated hereinafter.

For the purposes of the present invention, polyisocyanate is to be understood as meaning a polyfunctional isocyanate. Suitable polyisocyanates are, in particular, those based on diphenylmethane diisocyanate (MDI) and tolylene diisocyanate (TDI).

In the process according to the invention, at least one polyisocyanate is reacted as component a), wherein component a) consists of at least one polyisocyanate based on diphenylmethane diisocyanate (MDI). Component a) preferably consists of at least one MDI-based polyisocyanate.

MDI-based polyisocyanates are 2,2'-diphenylmethane diisocyanate, 2,4'-diphenylmethane diisocyanate, 4,4'-diphenylmethane diisocyanate, and multiring diphenylmethane diisocyanate (multiring MDI, i.e. having 3 or more aryl rings), which is also referred to as polyphenylpolymethylene isocyanate or oligomeric MDI, or mixtures of two or more of the aforementioned compounds, or crude MDI obtained from MDI production.

In one embodiment, the abovementioned MDI-based polyisocyanates are used in admixture with further polyisocyanates, in particular further aromatic polyisocyanates, preferably tolylene diisocyanate (TDI). In another preferred embodiment, exclusively MDI-based polyisocyanates are reacted.

Particularly preferred as MDI-based polyisocyanate is a multiring MDI in admixture with a two-ring MDI, in particular 4,4'-MDI and optionally 2,4'-MDI.

Oligomeric MDI comprises one or more multiring MDI condensation products having a functionality of more than 2, in particular 3 or 4 or 5. Oligomeric MDI is normally used in admixture with monomeric MDI.

Component a) preferably comprises from 60 to 100% by weight of 4,4'-MDI based on the total weight of component a), more preferably from 65 to 90% by weight, particularly preferably from 68 to 80% by weight, most preferably from 70 to 80% by weight.

Component a) preferably comprises from 65 to 90% by weight of 4,4'-MDI, from 0 to 20% by weight of 2,4'-MDI, and from 10 to 30% by weight of multiring MDI, in each case based on the total weight of component a).

Component a) more preferably comprises from 68 to 90% by weight, particularly preferably from 70 to 80% by weight, of 4,4'-MDI, from 0 to 20% by weight, more preferably from 1 to 17% by weight, particularly preferably from 1 to 12% by weight, most preferably from 1 to 10% by weight, of 2,4'-MDI, and from 10 to 30% by weight, more preferably from 13 to 28% by weight, of multiring MDI, in each case based on the total weight of component a).

A corresponding composition of component a) results in high compression hardness and elongation at break allied with high rebound resilience and good durability, without any adverse effect on air permeability.

The (number-average) functionality of component a) can vary in the range from about 2 to about 4, more preferably from 2 to 3 and particularly preferably from 2.1 to 2.7.

Polyfunctional isocyanates or mixtures of a plurality of polyfunctional isocyanates based on MDI are known and are marketed, for example, by BASF Polyurethanes GmbH under the name Lupranat®.

The content of isocyanate groups in component a) is preferably from 5 to 10 mmol/g, more preferably from 6 to 9 mmol/g, particularly preferably from 7 to 8.5 mmol/g. It is known to those skilled in the art that the content of isocyanate groups in mmol/g and the so-called equivalent weight in g/equivalent are in a reciprocal ratio. The content of isocyanate groups in mmol/g is calculated from the content in % by weight according to ASTM D-5155-96 A.

The viscosity of the component a) used may vary within a wide range. Component a) has a viscosity at 25° C. preferably from 10 to 300 mPa·s, more preferably from 20 to 250 mPa·s.

In a preferred embodiment, component a) is used wholly or partly in the form of polyisocyanate prepolymers.

These polyisocyanate prepolymers are obtainable by reacting beforehand all or some of the above-described polyisocyanates according to component a) with polymeric compounds reactive toward isocyanates to form the isocyanate prepolymer. The reaction takes place in an excess of component a), for example at temperatures of 30 to 100'C, preferably at about 80° C. The use of polyisocyanate prepolymers improves the tensile strength and rebound resilience of the flexible polyurethane foams obtainable according to the invention.

Suitable polymeric compounds having groups reactive toward isocyanates are known to those skilled in the art and described for example in "Kunststoffhandbuch [Plastics Handbook], volume 7, Polyurethane [Polyurethanes]", Carl Hanser Verlag, 3rd edition 1993, chapter 3.1.

Suitable polymeric compounds having groups reactive toward isocyanates may in principle be all known compounds having at least two hydrogen atoms reactive toward isocyanates, for example those having a functionality of 2 to 8 and with a number-average molecular weight Mn of 400 to 15 000 g/mol. Thus it is possible, for example, to use compounds selected from the group consisting of polyether polyols, polyester polyols, and mixtures thereof.

Examples of suitable prepolymers are described in DE 10314762.

Preferred polymeric compounds having groups reactive toward isocyanates are polyether polyols according to component b1), b2), and/or b3), in particular polyether polyols according to component b1). The abovementioned polymeric compounds are preferably reacted with the abovenamed polyisocyanates, with the latter being present in excess.

The NCO content of the prepolymers used is preferably in the range from 20 to 32.5%, particularly preferably from 25 to 31%. The NCO content is determined according to ASTM D-5155-96 A).

In a preferred embodiment, chain extenders and/or crosslinkers are used as component c) in the process for producing flexible polyurethane foams.

Compounds having at least two groups reactive toward isocyanates and with a molecular weight of less than 400 g/mol may be used as chain extenders and crosslinkers c), with molecules having two hydrogen atoms reactive toward isocyanate being referred to as chain extenders and molecules having more than two hydrogen atoms reactive toward isocyanate as crosslinkers. It is, however, also possible to omit the chain extender or crosslinker. The addition of chain extenders, crosslinkers or optionally also mixtures thereof may, however, be advantageous in order to modify the mechanical properties, e.g. hardness.

If chain extenders and/or crosslinkers c) are used, the chain extenders and/or crosslinkers known in the production of polyurethanes may be used. These are preferably low-molecular-weight compounds with functional groups reactive toward isocyanates, for example butanediol, 2-methyl-1,3-propanediol, sorbitol, glycerol, trimethylolpropane, glycols, and diamines. Further possible low-molecular-weight chain extenders and/or crosslinkers are given, for example, in "Kunststoffhandbuch [Plastics Handbook], volume 7, Polyurethane [Polyurethanes]", Carl Hanser Verlag, 3rd edition 1993, chapter 3.4.

In a preferred embodiment of the process according to the invention, at least one catalyst is used as component d).

Catalysts d) strongly accelerate the reaction with component a) of polyols b) and op tionally chain extender and crosslinker c) and also blowing agent e).

In one embodiment, component d) comprises incorporable amine catalysts. These have at least one, preferably 1 to 8 and particularly preferably 1 to 2 groups reactive toward isocyanates, such as primary amine groups, secondary amine groups, hydroxyl groups, amides or urea groups, preferably primary amine groups, secondary amine groups, hydroxyl groups. Incorporable amine catalysts are used mostly in the production of low-emission polyurethanes, which are used particularly in automobile interiors. Such catalysts are known and described for example in EP1888664. These include compounds that, in addition to groups reactive toward isocyanates, preferably have one or more tertiary amino groups. At least one of the tertiary amino groups in the incorporable catalysts preferably bears at least two aliphatic hydrocarbon radicals, preferably having 1 to 10 carbon atoms per radical, more preferably having 1 to 6 carbon atoms per radical. More preferably, the tertiary amino groups bear two radicals independently selected from methyl and ethyl radical plus a further organic radical. Examples of incorporable catalysts that may be used are bis(dimethylaminopropyl)urea, bis(N,N-dimethylaminoethoxyethyl) carbamate, dimethylaminopropylurea, N,N,N-trimethyl-N-hydroxyethylbis(aminopropylether), N,N,N-trimethyl-N-hydroxyethylbis(aminoethylether), diethylethanolamine, bis(N,N-dimethyl-3-aminopropyl) amine, dimethylaminopropylamine, 3-dimethylaminopropyl-N,N-dimethylpropane-1,3-diamine, dimethyl-2-(2-aminoethoxyethanol) and (1,3-bis(dimethylamino)propan-2-ol), N,N-bis(3-dimethylaminopropyl)-N-isopropanolamine, bis (dimethylaminopropyl)-2-hydroxyethylamine, N,N,N-trimethyl-N-(3-aminopropyl)-bis(aminoethylether), 3-dimethylaminoisopropyl diisopropanolamine, or mixtures thereof.

In addition to incorporable amine catalysts, customary catalysts for the production of polyurethanes may further be used. Examples include amidines such as 2,3-dimethyl-3,4, 5,6-tetrahydropyrimidine, tertiary amines such as triethylamine, tributylamine, dimethylbenzylamine, N-methyl-, N-ethyl-, and N-cyclohexylmorpholine, N,N,N',N'-tetremethylethylenediamine, N,N,N',N'-tetramethylbutanediamine, N,N,N',N'-tetramethylhexanediamine, pentamethyldiethylenetriamine, tetramethyldiaminoethyl ether, bis (dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds such as triethanolamine, triisopropanolamine, N-methyl- and N-ethyldiethanolamine, and dimethylethanolamine. Likewise suitable are organic metal compounds, preferably organic tin compounds, such as tin(II) salts of organic carboxylic acids, for example tin(II) acetate, tin(II) octanoate, tin(II) ethylhexanoate, and tin(II) laurate, and dialkyltin(IV) salts of organic carboxylic acids, for example dibutyltin diacetate, dibutyltin dilaurate, tin ricinolate, dibutyltin maleate, and dioctyltin diacetate, and also zinc carboxylates such as zinc ricinolate, and also bismuth carboxylates such as bismuth(III) neodecanoate, bismuth 2-ethylhexanoate, and bismuth octanoate, or mixtures thereof. The organic metal compounds may be used either alone or preferably in combination with strongly basic amines.

If catalysts d) are used, these may be used as a catalyst/catalyst combination, for example in an amount of 0.001 to 5 parts by weight, in particular 0.05 to 2 parts by weight, based on 100 parts by weight of component b).

In the process according to the invention, at least one blowing agent e) comprising water is used.

In addition to water, all blowing agents known in the production of polyurethanes may in principle be used. These may comprise chemical and/or physical blowing agents.

Such blowing agents are described in, for example, "Kunststoffhandbuch [Plastics Handbook], volume 7, Polyurethane [Polyurethanes]", Carl Hanser Verlag, 3rd edition 1993, chapter 3.4.5. Chemical blowing agents are understood here as meaning compounds that form gaseous products by reaction with isocyanate. Examples of such blowing agents are not only water but also carboxylic acids. Physical blowing agents are understood here as meaning compounds that are dissolved or emulsified in the starting materials for the polyurethane production and vaporize under the conditions of polyurethane formation. Examples of these are hydrocarbons, halogenated hydrocarbons, and other compounds, for example perfluorinated alkanes such as perfluorohexane, chlorofluorohydrocarbons, and ethers, esters, ketones, acetals and/or liquid carbon dioxide. The amount of blowing agent used here may be freely chosen.

It is preferable if water is used as sole blowing agent e).

The blowing agent is preferably used in an amount that results in a polyurethane foam having a density of 10 to 80 g/L, more preferably 20 to 60 g/L, and particular preferably 25 to 60 g/L.

Auxiliaries and/or additives f) that differ from components a) to e) may additionally be used. All auxiliaries and additives known in the production of polyurethanes may be used. Examples include surface-active substances, foam stabilizers, cell regulators, release agents, fillers, dyes, pigments, flame retardants, hydrolysis stabilizers, and fungistatic and bacteriostatic substances. Such substances are known and are described for example in "Kunststoffhandbuch [Plastics Handbook], volume 7, Polyurethane [Polyurethanes]", Carl Hanser Verlag, 3rd edition 1993, chapter 3.4.

Examples of suitable surface-active substances are compounds which are used to promote homogenization of the starting materials and which are optionally also suitable for regulation of the cell structure of the foams. Examples of these include siloxaneoxyalkylene copolymers and other organopolysiloxanes, ethoxylated alkylphenols, ethoxylated fatty alcohols, paraffin oils, castor oil esters or ricinoleic esters, which are used in amounts from 0.2 to 8, preferably from 0.5 to 5 parts by weight per 100 parts by weight of component b).

Examples of suitable flame retardants are compounds containing phosphorus and/or halogen atoms, for example tricresyl phosphate, tris(2-chloroethyl) phosphate, tris(chloropropyl) phosphate, 2,2-bis(chloromethyl)trimethylene bis (bis(2-chloroethyl) phosphate), oligomeric organophosphorus compounds (for example Fyrol® PNX, Fyrolflex® RDP), and tris(2,3-dibromopropyl) phosphate.

In addition to the abovementioned halogen-substituted phosphates, it is also possible to use inorganic flame retardants, for example antimony trioxide, arsenic oxide, ammonium polyphosphate, expandable graphite, and calcium sulfate, or melamine for making the polyurethane foams flame-resistant.

It has generally been found to be advantageous to use 5 to 50 parts by weight, preferably 5 to 35 parts by weight of said flame retardant, based on 100 parts by weight of component b).

In the production of the flexible polyurethane foams according to the invention, the polyisocyanates a), the polyols b), the catalysts d), the blowing agents e) and optionally chain extenders and/or crosslinkers c) and optionally additives f) are generally reacted at temperatures from 0 to 70'C, preferably 15 to 50° C., in amounts such that the equivalence ratio of NCO groups in the polyisocyanates a) to the sum total of reactive hydrogen atoms in components b), c), and optionally e) and f) is 0.75-1.5 to 1, preferably 0.80-1.25 to 1, more preferably from 0.9-1.2 to 1, particularly preferably from 0.95-1.15 to 1. A ratio of 1:1 corresponds here to an isocyanate index of 100.

The present invention further provides the flexible poly- urethane foams obtainable by the process of the invention.

The flexible polyurethane foams obtainable according to the invention preferably have a rebound resilience according to DIN EN ISO 8307 of at least 30%, preferably at least 40%, particularly preferably at least 45%, and exhibit an air permeability according to DIN EN ISO 7231 of at least 3.0 $dm^3/s$, preferably at least 3.5 $dm^3/s$, more preferably at least 4.0 $dm^3/s$, and particularly preferably at least 4.5 $dm^3/s$.

The foam density according to DIN EN ISO 3386 of the flexible polyurethane foams according to the invention is preferably less than 150 g/l, preferably from 20 to 100 g/l, more preferably from 25 to 80 g/l, and particularly preferably from 25 to 60 g/l.

The compression hardness at 40% according to DIN EN ISO 3386 of the polyurethane foams obtainable according to the invention is preferably from 2 to 10 kPa, more preferably from 2.2 to 6.5 kPa.

The present invention further provides uses of the poly- urethane foams according to the invention as a mattress or cushion, as a cushioning element for furniture or as a seat element, particularly in modes of transport such as buses, trains, and aircraft or in buildings such as movie theaters, theaters, offices, stadiums.

The flexible polyurethane foams according to the invention are particularly preferably used for mattresses and cushions. The mixtures used according to the invention are suitable for producing flexible polyurethane foams by the block foam process and by the foam molding process.

The flexible polyurethane foams according to the invention are characterized by good mechanical properties, in particular high values for tensile strength and elongation at break. The flexible polyurethane foams according to the invention also have excellent air permeabilities and thus a good microclimate when used as a mattress or pillow, as well as good durability and thus a long product lifetime.

The invention is illustrated hereinafter with reference to examples.

EXAMPLES

The constituents listed in Tables 2, 3, 5, and 7 were foamed to a flexible polyurethane foam using water as blowing agent.

For this purpose, a poyol component was produced by mixing the specified polyether polyols, catalysts, and addi- tives. The polyol component was mixed with the specified polyisocyanates at an index of 100 and introduced into an open mold.

The properties of the resulting flexible polyurethane foams are given in Tables 4, 6, and 8 below.

Starting materials used:

Polyol A: OH value 42 mg KOH/g, polyether polyol based on propylene oxide and ethylene oxide (72% by weight) having 77% primary OH groups, starter glyc- erol. The mean functionality is 2.7.

Polyol B: OH value 35 mg KOH/g, polyether polyol based on propylene oxide and ethylene oxide (13% by weight) having 72% primary OH groups, starter glyc- erol. The mean functionality is 2.7.

Polyol C: OH value 48 mg KOH/g, polyether polyol based on propylene oxide and ethylene oxide (10% by weight) having fewer than 5% primary OH groups, starter glycerol, ethylene glycol. The mean functional- ity is 2.5.

Polyol D: OH value 20 mg KOH/g, graft polyol having a 45% content of solids (styrene-acrylonitrile) in polyol B as carrier polyol. The mean functionality is 2.7.

Polyol E: OH value 29 mg KOH/g, polyether polyol based on propylene oxide and ethylene oxide (16% by weight) having 79% primary OH groups, starter glyc- erol. The mean functionality is 2.7.

DEOA—Diethanolamine 80% in water

DABCO®33 LV—Gel catalyst in dipropylene glycol (Air Products)

Niax® A1—Blowing catalyst (Momentive)

DABCO® NE 300—Blowing catalyst (Air Products)

Tegostab® B 4900—Silicone stabilizer (Evonik)

Tegostab® B8783 LF2—Silicone stabilizer (Evonik)

Isocyanate A: NCO content 31.5% by weight, mixture of two-ring and multiring MDI having a functionality of 2.7

Isocyanate B: NCO content 33.5% by weight, 4,4'-MDI (~99%)

Isocyanate C: NCO content 33.5% by weight, 4,4'-MDI (~50%) and 2,4'-MDI (~50%) isomer mixture

TABLE 1

Standards used for foam tests

| Property | Unit | Standard |
|---|---|---|
| Foam density | $kg/m^3$ | DIN EN ISO 3386 |
| Compression hardness 40% | kPa | DIN EN ISO 3386 |
| Hysteresis | % | DIN EN ISO 3386 |
| Tensile strength | kPa | DIN EN ISO 1798 |
| Elongation at break | % | DIN EN ISO 1798 |
| Tear resistance | N/mm | DIN EN ISO 34-1, B(b) |
| Air permeability[2] | $dm^3/s$ | DIN EN ISO 7231 |
| Rebound resilience | % | DIN EN ISO 8307 |
| FT[1] - Loss of hardness | % | DIN EN ISO 3385 |

[1]FT—Fatigue test
[2]Measured after fulling the foam to achieve complete cell opening.

TABLE 2

Composition of component A used (isocyanates A, B, and C and polyether polyol A) in parts by weight. This was used to calculate the composition of component a) in % by weight. The missing amount to 100% by weight is in each case 2,2'-MDI.

| | Iso A | Iso B | Iso C | Poly- ether polyol A | 4,4' MDI [% by weight] | 2,4' MDI [% by weight] | Multi- ring MDI [% by weight] |
|---|---|---|---|---|---|---|---|
| Isocyanate 1 | 37.5 | 20.4 | 42.1 | — | 54.8 | 22.4 | 21.8 |
| Isocyanate 2 | 30.0 | 36.3 | 33.7 | — | 63.5 | 18.2 | 17.5 |
| Isocyanate 3 | 35.2 | 35.2 | 17.1 | 12.5 | 64.3 | 11.8 | 23.4 |
| Isocyanate 4 | 2.63 | 44.3 | 29.5 | — | 68.0 | 16.1 | 15.3 |
| isocyanate 5 | 40.0 | 50.0 | — | 10.0 | 71.4 | 2.7 | 25.9 |
| Isocyanate 6 | 31.3 | 53.5 | 15.2 | — | 71.9 | 9.5 | 18.2 |
| Isocyanate 7 | 28.2 | 48.2 | 13.7 | 10.0 | 71.9 | 9.5 | 18.2 |
| Isocyanate 8 | 24.6 | 54.6 | 12.0 | 8.8 | 75.6 | 8.4 | 15.7 |
| Isocyanate 9 | 29.0 | 61.0 | — | 10.0 | 78.9 | 2.3 | 18.8 |

TABLE 3

Amounts used of the freely-foamed flexible polyurethane foams (total weight of the components
used: isocyanate, polyols, and additives approx. 2.5 kg). All data in parts by weight.

| | Example | | | | | | | | | |
|---|---|---|---|---|---|---|---|---|---|---|
| | V1 | V2 | V3 | V4 | V5 | V6 | 1 | 2 | 3 | 4 |
| Polyol A | 65.0 | 70.0 | 80.0 | 80.0 | 80.0 | 80.0 | 75.0 | 80.0 | 80.0 | 80 |
| Polyol B | 15.0 | 10.0 | — | — | 7.0 | — | 5.0 | — | — | 13.0 |
| Polyol C | 7.0 | 7.0 | 20.0 | — | — | 2.0 | 7.0 | 12.0 | 7.0 | 7.0 |
| Polyol D | 13.0 | 13.0 | — | 20.0 | 13.0 | 18.0 | 13.0 | 8.0 | 13.0 | — |
| Isoc. 7 | 49.7 | 49.8 | 50.6 | 49.4 | 49.6 | 49.5 | 49.8 | 50.3 | 49.9 | 50.3 |
| 33 LV | 0.10 | 0.10 | 0.10 | 0.10 | 0.10 | 0.10 | 0.10 | 0.10 | 0.10 | 0.1 |
| NE 300 | 0.30 | 0.30 | 0.30 | 0.30 | 0.30 | 0.30 | 0.30 | 0.30 | 0.30 | 0.3 |
| B 4900 | 1.00 | 1.00 | 1.00 | 1.00 | 1.00 | 1.00 | 1.00 | 1.00 | 1.00 | 1.00 |
| Water | 2.45 | 2.45 | 2.45 | 2.45 | 2.45 | 2.45 | 2.45 | 2.45 | 2.45 | 2.45 |
| Index | 100 | 100 | 100 | 100 | 100 | 100 | 100 | 100 | 100 | 100 |
| % by weight of polyol A' (comp. b1) | 69.0 | 74.3 | 80.0 | 87.9 | 85.0 | 87.1 | 79.7 | 83.0 | 85.0 | 80.0 |
| % by weight of polyol B' (comp. b2) | 23.5 | 18.2 | — | 12.1 | 15.0 | 10.8 | 12.9 | 4.6 | 7.6 | 13.0 |
| % by weight of polyol C' (comp. b3) | 7.5 | 7.5 | 20.0 | — | — | 2.1 | 7.4 | 12.4 | 7.4 | 7.0 |
| Further parts by weight of filler SAN' (comp. b5) | 5.9 | 5.9 | — | 9.0 | 5.9 | 8.1 | 5.9 | 3.6 | 5.9 | — |

The amounts by weight indicated by A', B', and C' are %
by weight and come to 100% by weight. The amount
indicated by SAN' is further parts by weight in addition to
100 parts by weight of components A', B', and C'.

A foam comprising 50 parts polyol A, 30 parts poyol B,
7 parts poyol C, and 13 parts polyol D collapsed and could
not be characterized.

TABLE 4

Mechanical properties of the resulting flexible foams.

| | Example | | | | | | | | | |
|---|---|---|---|---|---|---|---|---|---|---|
| | V1 | V2 | V3 | V4 | V5 | V6 | 1 | 2 | 3 | 4 |
| Foam density (kg/m$^3$) | 42.4 | 42.3 | 42.3 | 41.4 | 41.8 | 41.6 | 41.7 | 41.4 | 41.6 | 43.0 |
| Compression hardness 40% (kPa) | 2.6 | 2.7 | 2.5 | 4.4 | 3.6 | 3.5 | 2.7 | 2.4 | 3.0 | 3.5 |
| Hysteresis (%) | 26.5 | 26.1 | 24.2 | 24.8 | 22.5 | 23.7 | 24.1 | 23.7 | 23.5 | 24.7 |
| Tensile strength (kPa) | 98 | 85 | 35 | 34 | 38 | 37 | 68 | 61 | 72 | 37 |
| Elongation at break (%) | 176 | 168 | 102 | 55 | 75 | 71 | 145 | 136 | 152 | 93 |
| fear resistance (N/mm) | 0.75 | 6.73 | 6.44 | 0.30 | 0.33 | 0.33 | 0.68 | 0.62 | 0.58 | 0.40 |
| Air permeability[2] (dm$^3$/s) | 2.0 | 2.9 | 6.4 | 2.6 | 2.5 | 2.6 | 3.8 | 6.0 | 4.8 | 3.9 |
| Rebound resilience (%) | 45 | 46 | 47 | 47 | 50 | 48 | 47 | 48 | 49 | 48 |
| FT[1] - Loss of hardness (%) | 16.7 | 16.3 | 21.1 | 22.2 | 17.3 | 16.7 | 14.2 | 15.2 | 14.9 | 15.6 |

[1]FT—Fatigue test
[2]Measured after fulling the foam to achieve complete cell opening.

TABLE 5

Constituents of the freely-foamed flexible polyurethane foams (total weight of the components used: isocyanate, polyether polyols, and additives approx. 2.5 kg). All data in parts by weight.

| | Example | | | | | | | | |
|---|---|---|---|---|---|---|---|---|---|
| | 5 | 6 | 7 | 8 | 9 | 10 | 3 | 11 | 12 |
| Polyol A | 80.0 | 80.0 | 80.0 | 80.0 | 80.0 | 80.0 | 80.0 | 80.0 | 80.0 |
| Polyol C | 7.0 | 7.0 | 7.0 | 7.0 | 7.0 | 7.0 | 7.0 | 7.0 | 7.0 |
| Polyol D | 13.0 | 13.0 | 13.0 | 13.0 | 13.0 | 13.0 | 13.0 | 13.0 | 13.0 |
| Iso # | Iso 1 | Iso 2 | Iso 3 | Iso 4 | Iso 5 | Iso 6 | Iso 7 | Iso 8 | Iso 9 |
| Parts | 44.3 | 44.1 | 51.9 | 44.0 | 49.4 | 44.1 | 49.9 | 49.0 | 49.0 |
| 33 LV | 0.10 | 0.10 | 0.10 | 0.10 | 0.10 | 0.10 | 0.10 | 0.10 | 0.10 |
| NE 300 | 0.30 | 0.30 | 0.30 | 0.30 | 0.30 | 0.30 | 0.30 | 0.30 | 0.30 |
| B 4900 | 1.00 | 1.00 | 1.00 | 1.00 | 1.00 | 1.00 | 1.00 | 1.00 | 1.00 |
| Water | 2.45 | 2.45 | 2.45 | 2.45 | 2.45 | 2.45 | 2.45 | 2.45 | 2.45 |
| Index | 100 | 100 | 100 | 100 | 100 | 100 | 100 | 100 | 100 |
| % by weight of polyol A' (comp. b1) | 85.0 | 85.0 | 85.0 | 85.0 | 85.0 | 85.0 | 85.0 | 85.0 | 85.0 |
| % by weight of polyol B' (comp. b2) | 7.6 | 7.6 | 7.6 | 7.6 | 7.6 | 7.6 | 7.6 | 7.6 | 7.6 |
| % by weight of polyol C' (comp. b3) | 7.4 | 7.4 | 7.4 | 7.4 | 7.4 | 7.4 | 7.4 | 7.4 | 7.4 |
| Further parts by weight of filler SAN' (comp. b5) | 5.9 | 5.9 | 5.9 | 5.9 | 5.9 | 5.9 | 5.9 | 5.9 | 5.9 |

The amounts by weight indicated by A', B', and C' are % by weight and come to 100% by weight. The amount indicated by SAN' is further parts by weight in addition to 100 parts by weight of components A', B', and C'.

TABLE 6

Mechanical properties of the resulting flexible foams.

| | Example | | | | | | | | |
|---|---|---|---|---|---|---|---|---|---|
| | 5 | 6 | 7 | 8 | 9 | 10 | 3 | 11 | 12 |
| Foam density (kg/m³) | 39.8 | 38.8 | 42.2 | 39.6 | 42.1 | 40.4 | 41.6 | 41.8 | 42.1 |
| Compression hardness 40% (kPa) | 1.1 | 1.9 | 1.4 | 2.9 | 2.5 | 3.1 | 3.0 | 3.2 | 3.2 |
| Hysteresis (%) | 19.3 | 23.1 | 16.7 | 26.2 | 21.7 | 25.1 | 23.5 | 22.6 | 21.1 |
| Tensile strength (kPa) | 48 | 55 | 54 | 56 | 67 | 55 | 72 | 54 | 59 |
| Elongation at break (%) | 142 | 152 | 134 | 127 | 139 | 115 | 152 | 107 | 124 |
| Tear resistance (N/mm) | 0.54 | 0.61 | 0.45 | 0.60 | 0.52 | 0.51 | 0.58 | 0.45 | 0.44 |
| Air permeability[2] (dm³/s) | 4.7 | 4.8 | 5.0 | 4.4 | 4.5 | 4.5 | 4.8 | 4.6 | 5.0 |
| Rebound resilience (%) | 33 | 42 | 35 | 48 | 45 | 46 | 49 | 52 | 54 |
| FT[1] - Loss of hardness (%) | 12.5 | 12.0 | 12.3 | 16.4 | 12.1 | 15.4 | 14.9 | 15.7 | 15.0 |

[1]FT—Fatigue test

[2]Measured after fulling the foam to achieve complete cell opening.

TABLE 7

Constituents of the freely-foamed flexible polyurethane foams (total weight of the components used: isocyanate, polyols, and additives approx. 2.5 kg). All data in parts by weight.

| | Example | | | | |
|---|---|---|---|---|---|
| | V7 | V8* | V9 | V10* | 3 |
| Polyol A | — | — | 1.0 | 1.0 | 80.0 |
| Polyol B | 17.6 | 17.6 | — | — | — |
| Polyol C | — | — | — | — | 7.0 |

TABLE 7-continued

Constituents of the freely-foamed flexible polyurethane foams (total weight of the components used: isocyanate, polyols, and additives approx. 2.5 kg). All data in parts by weight.

| | Example | | | | |
|---|---|---|---|---|---|
| | V7 | V8* | V9 | V10* | 3 |
| Polyol D | 10.2 | 10.2 | — | — | 13.0 |
| Polyol E | 72.5 | 72.5 | 99.0 | 99.0 | — |
| DEOA | 1.2 | 1.2 | 1.2 | 1.2 | — |

TABLE 7-continued

Constituents of the freely-foamed flexible polyurethane foams
(total weight of the components used: isocyanate, polyols,
and additives approx. 2.5 kg). All data in parts by weight.

| | | | Example | | |
|---|---|---|---|---|---|
| | V7 | V8* | V9 | V10* | 3 |
| Iso # | Iso 1 | Iso 7 | Iso1 | Iso 7 | Iso 7 |
| Parts | 49.7 | 56.0 | 51.1 | 56.8 | 49.9 |
| 33 LV | 0.25 | 0.25 | 0.25 | 0.25 | 0.1 |
| NE 300 | 0.15 | 0.15 | — | — | 0.3 |
| Niax A1 | — | — | 0.05 | 0.05 | — |
| B8783 LF2 | 0.35 | 0.35 | 0.35 | 0.35 | — |
| B 4900 | — | — | — | — | 1.00 |
| Water | 2.75 | 2.75 | 3.25 | 3.25 | 2.45 |
| Index | 100 | 100 | 90 | 90 | 100 |

*Foams V8 and V10 collapsed and could not be characterized.

TABLE 8

Mechanical properties of the resulting flexible foams

| | Example | | |
|---|---|---|---|
| | V7 | V9 | 3 |
| Foam density (kg/m³) | 45.3 | 39.0 | 41.6 |
| Compression hardness 40% (kPa) | 4.5 | 2.8 | 3.0 |
| Hysteresis (%) | 28.3 | 26.6 | 23.5 |
| Tensile strength (kPa) | 74 | 85 | 72 |
| Elongation at break (%) | 92 | 124 | 152 |
| Tear resistance (N/mm) | 0.34 | 0.45 | 0.58 |
| Air permeability² (dm³/s) | 0.8 | 1.0 | 4.8 |
| Rebound resilience (%) | 56 | 60 | 49 |
| FT¹ - Loss of hardness (%) | 28.0 | 29.9 | 14.9 |

[1]FT—Fatigue test
[2]Measured after fulling the foam to achieve complete cell opening.

The invention claimed is:

1. An elastic foam made from at least one polyisocyanate based on diphenylmethane diisocyanate, and a mixture b comprising the following components:

b1) at least one polyether polyol having a hydroxyl value of 10 to 60 mg KOH/g, an OH functionality of more than 2, and oxyalkylene units comprising oxyethylene units in a proportion of 50 to 100% by weight based on the content of oxyalkylene units, b2) at least one polyether polyol having a hydroxyl value of 10 to 100 mg KOH/g, an OH functionality of more than 2, oxyalkylene units comprising oxyethylene units in a proportion of 2 to 30% by weight based on the content of oxyalkylene units, and a proportion of primary OH groups of 40 to 100% based on the total number of OH groups in component b2)

b3) at least one polyether polyol having a hydroxyl value of 10 to 100 mg KOH/g, an OH functionality of more than 2, oxyalkylene units comprising oxyethylene units in a proportion of 0 to 30% by weight based on the content of oxyalkylene units, and a proportion of primary OH groups of greater than 0 to 30% based on the total number of OH groups in component b3)

wherein b1) is present in an amount of 75 to 94% by weight, b2) is present in an amount of 3 to 20% by weight, and b3) is present in an amount of 3 to 20% by weight, in each case based on the total amount by weight of components b1) to b3), optionally b4) at least one further polyether polyol that differs from components b1) to b3), and optionally b5) a graft polyol based on one or more of components b1) to b3);

wherein the amount of b4) is from 0 to 10 parts by weight and the amount of b5) is from 0 to 30 parts by weight based on 100 parts by weight of components b1) to b3);

where the elastic foam has a rebound resilience measured according to DIN EN ISO 8307 of not less than 30%, and wherein the elastic foam exhibits an air permeability according to DIN EN ISO 7231 of at least 3.0 dm³/s.

2. The elastic foam according to claim 1, wherein the proportion of primary OH groups in component b2) based on the total number of OH groups in component b2) is from 50 to 100%.

3. The elastic foam according to claim 1, wherein the proportion of primary OH groups in component b3) based on the total number of OH groups in component b3) is from greater than 0 to 25%.

4. The elastic foam according to claim 1, wherein component b2) has an OH functionality of at least 2.4.

5. The elastic foam according to claim 1, wherein component b3) has an OH functionality of 2.4 to 3.

6. The elastic foam according to claim 1, wherein component b1) has an OH functionality of at least 2.4.

7. The elastic foam according to claim 1, wherein component b1) has a proportion of primary OH groups of 40 to 100% based on the total number of OH groups in component b1).

8. The elastic foam according to claim 1 comprising from λto 92% by weight of component b1), from 4 to 16% by weight of component b2), and from 4 to 15% by weight of component b3).

9. The elastic foam according to claim 1, wherein component b) comprises from 0.5 to 8 parts by weight of filler present as a constituent of a graft polyol based on one or more of components b1) to b3), based on 100 parts by weight of components b1) to b3).

10. A process for producing flexible elastic polyurethane foams in which the following components are mixed to form a reaction mixture and converted into the flexible polyurethane foam:

a) at least one polyisocyanate, wherein at least one of the polyisocyanates present is based on diphenylmethane diisocyanate, b) a mixture b comprising the following components:

b1) at least one polyether polyol having a hydroxyl value of 10 to 60 mg KOH/g, an OH functionality of more than 2, and oxyalkylene units comprising oxyethylene units in a proportion of 50 to 100% by weight based on the content of oxyalkylene units, b2) at least one polyether polyol having a hydroxyl value of 10 to 100 mg KOH/g, an OH functionality of more than 2, oxyalkylene units comprising oxyethylene units in a proportion of 2 to 30% by weight based on the content of oxyalkylene units, and a proportion of primary OH groups of 40 to 100% based on the total number of OH groups in component b2)

b3) at least one polyether polyol having a hydroxyl value of 10 to 100 mg KOH/g, an OH functionality of more than 2, oxyalkylene units comprising oxyethylene units in a proportion of 0 to 30% by weight based on the content of oxyalkylene units, and a proportion of primary OH groups of greater than 0 to 30% based on the total number of OH groups m component b3)

wherein b1) is present in an amount of 75 to 94% by weight, b2) is present in an amount of 3 to 20% by weight, and b3) is present in an amount of 3 to 20% by weight, in each case based on the total amount by weight of components b1) to b3), optionally b4) at least one further polyether polyol that differs from components b1) to b3), and optionally b5) a graft polyol based on one or more of components b1) to b3);

wherein the amount of b4) is from 0 to 10 parts by weight and the amount of b5) is from 0 to 30 parts by weight based on 100 parts by weight of components b1) to b3), c) optionally chain extenders and/or crosslinkers, d) at least one catalyst, and e) at least one blowing agent comprising water, and f) optionally one or more additives;

where the elastic foam has a rebound resilience measured according to DIN EN ISO 8307 of not less than 30%, and wherein the elastic foam exhibits an air permeability according to DIN EN ISO 7231 of at least 3.0 dm³/s.

11. The process according to claim 10, wherein component a) comprises from 60 to 100% by weight of 4,4'-diphenylmethane diisocyanate based on the total weight of component a).

12. The process according to claim 10, wherein component a) comprises from 65 to 90% by weight of 4,4'-diphenylmethane diisocyanate, from 0 to 20% by weight of 2,4'-diphenylmethane diisocyanate, and from 10 to 30% by weight of multiring diphenylmethane diisocyanate, in each case based on the total weight of component a).

13. The process according to claim 10, wherein component a) comprises from 68 to 90% by weight of 4,4'-diphenylmethane diisocyanate, from 0 to 20% by weight of 2,4'-diphenylmethane diisocyanate, and from 10 to 30% by weight of multiring diphenylmethane diisocyanate, in each case based on the total weight of component a).

14. The process according to claim 10, wherein water is used as the sole blowing agent e).

15. The process according to claim 10, wherein the foam density according to DIN EN ISO 3386 of the flexible polyurethane foams is from 25 to 60 kg/m³.

16. The process according to claim 10, wherein the compression hardness at 40% according to DIN EN ISO 3386 of the flexible polyurethane foams is from 2 to 10 kPa.

17. The process according to claim 10, wherein the rebound resilience of the flexible polyurethane foams according to DIN EN ISO 8307 is at least 45%.

18. A flexible polyurethane foam obtained by the process according to claim 10.

19. A mattress, cushion, or seat element comprising the flexible polyurethane foam according to claim 18.

* * * * *